(12) United States Patent
Zhou et al.

(10) Patent No.: US 12,444,783 B2
(45) Date of Patent: Oct. 14, 2025

(54) BATTERY APPARATUS INCLUDING LIQUID MEMBER THAT COOLS BATTERIES

(71) Applicant: CALB Co., Ltd., Jiangsu (CN)

(72) Inventors: Pengfei Zhou, Changzhou (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 592 days.

(21) Appl. No.: 17/878,916

(22) Filed: Aug. 2, 2022

(65) Prior Publication Data

US 2023/0335820 A1 Oct. 19, 2023

(30) Foreign Application Priority Data

Apr. 15, 2022 (CN) .......................... 202210399360.8

(51) Int. Cl.
| | |
|---|---|
| *H01M 50/40* | (2021.01) |
| *H01M 10/613* | (2014.01) |
| *H01M 10/643* | (2014.01) |
| *H01M 10/6555* | (2014.01) |
| *H01M 10/6567* | (2014.01) |
| *H01M 10/658* | (2014.01) |
| *H01M 50/213* | (2021.01) |

(52) U.S. Cl.
CPC ....... *H01M 10/613* (2015.04); *H01M 10/643* (2015.04); *H01M 10/6555* (2015.04); *H01M 10/6567* (2015.04); *H01M 10/658* (2015.04); *H01M 50/213* (2021.01)

(58) Field of Classification Search
CPC ............. H01M 10/613; H01M 10/643; H01M 10/6555; H01M 10/6567; H01M 10/658; H01M 50/213
See application file for complete search history.

(56) References Cited

U.S. PATENT DOCUMENTS

| | | | |
|---|---|---|---|
| 2004/0069620 A1 | 4/2004 | Bitsche et al. | |
| 2013/0196184 A1 | 8/2013 | Faass et al. | |

FOREIGN PATENT DOCUMENTS

| | | | | |
|---|---|---|---|---|
| CN | 106299550 | | 1/2017 | |
| CN | 106299550 A | * | 1/2017 | .......... H01M 10/663 |
| DE | 10034134 A1 | * | 1/2002 | .......... H01M 50/291 |

OTHER PUBLICATIONS

DE 10034134 English Translation (Year: 2002).*
CN 106299550 English Translation (Year: 2017).*
"Search Report of Europe Counterpart Application", issued on Sep. 5, 2023, p. 1-p. 9.

* cited by examiner

*Primary Examiner* — Jimmy Vo
(74) *Attorney, Agent, or Firm* — JCIP GLOBAL INC.

(57) ABSTRACT

A battery apparatus includes a liquid cooling member and at least two batteries arranged in a stack. The at least two batteries are located on a same side of the liquid cooling member, and the liquid cooling member is provided with a protrusion. The protrusion communicates with the liquid cooling member. The protrusion is located between the liquid cooling member and the at least two batteries, and the protrusion at least cools the at least two batteries simultaneously.

7 Claims, 5 Drawing Sheets

BATTERY APPARATUS INCLUDING LIQUID MEMBER THAT COOLS BATTERIES

CROSS-REFERENCE TO RELATED APPLICATION

This application claims the priority benefits of China application serial no. 202210399360.8, filed on Apr. 15, 2022. The entirety of the above-mentioned patent application is hereby incorporated by reference herein and made a part of this specification.

BACKGROUND

Technical Field

The present disclosure relates to the technical field of batteries, in particular to a battery apparatus.

Description of Related Art

In the related art, a liquid cooling tube is utilized to liquid cool the battery, but a stacked gap is formed between two adjacent batteries, such that the liquid cooling effect of the liquid cooling tube on the battery is reduced.

SUMMARY

The present disclosure provides a battery apparatus.

The present disclosure provides a battery apparatus, including a liquid cooling member and at least two batteries arranged in a stack. The at least two batteries are located on a same side of the liquid cooling member, and the liquid cooling member is provided with a protrusion. The protrusion is located between the liquid cooling member and the at least two batteries, the protrusion communicates with the liquid cooling member, and the protrusion at least cools the at least two batteries simultaneously.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect".

The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

This embodiment provides a battery apparatus. Referring to the structures shown in FIG. 1 and FIG. 2, the battery apparatus provided in this embodiment includes a liquid cooling member 200 and at least two batteries arranged in a stack. The at least two batteries are located on a same side of the liquid cooling member 200, and the liquid cooling member 200 is provided with a protrusion. The protrusion communicates with the liquid cooling member 200, the protrusion is located between the liquid cooling member 200 and the two batteries, and the protrusion at least cools the two batteries simultaneously.

Figure 1:
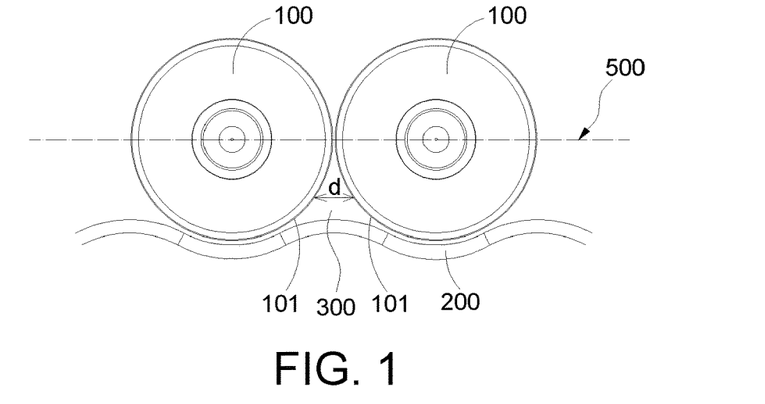
FIG. 1 is a schematic structural view of a stacked gap in a battery apparatus according to the present embodiment (the batteries are cylindrical batteries).
Figure 2:
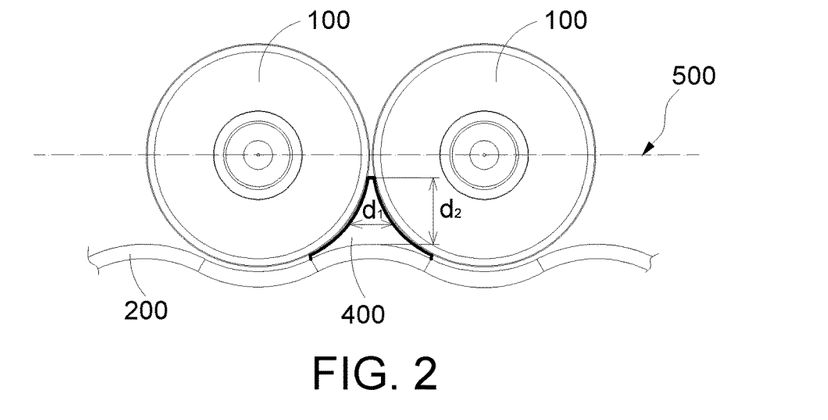
FIG. 2 is a partial top view of the battery apparatus according to the present embodiment.

In the battery apparatus provided in this embodiment, the at least two batteries are located on the same side of the liquid cooling member 200, and a stacked gap 300 is formed between the two batteries and the liquid cooling member

200. Since the liquid cooling member 200 is provided with a protrusion, and the protrusion is located between the liquid cooling member 200 and the two batteries, that is, the protrusion is located in the stacked gap 300. Since the protrusion communicates with the liquid cooling member 200, the liquid cooling medium in the liquid cooling member 200 can flow through the protrusion, and the liquid cooling medium inside the protrusion can at least cool two batteries simultaneously, thereby improving liquid cooling effect on the two batteries.

In an embodiment, the protrusion is disposed in contact with at least two batteries. The protrusion and the battery may be in direct contact or indirect contact, for example, the protrusion and the battery may be indirectly fixed through gluing.

In an embodiment, each of the batteries is a cylindrical battery 100. The cylindrical battery 100 has a top surface and a bottom surface disposed opposite to each other, and a circumferential surface 101 disposed around the top surface and bottom surface.

In an embodiment, the liquid cooling member 200 is a flat tube. Exemplarily, the liquid cooling member 200 is a serpentine flat tube. The wavy plate surface of the serpentine flat tube may be adapted to the circumferential surface 101 of the cylindrical battery 100, so as to facilitate the liquid cooling effect on the cylindrical battery 100.

Referring to FIG. 1, the two adjacent cylindrical batteries 100 are located on the same side of the serpentine flat tube, and the shortest distance d between the circumferential surfaces 101 of the two adjacent cylindrical batteries 100 gradually increases from a reference plane 500 in a direction toward the serpentine flat tube. A cavity enclosed by the reference plane 500, a surface of the serpentine flat tube adjacent to the batteries, and the circumferential surfaces 101 of the two adjacent cylindrical batteries 100 is the stacked gap 300, and as shown in FIG. 2, the protrusion is located within the stacked gap 300. The reference plane 500 is a plane where the axes of the two cylindrical batteries 100 located on the same side of the serpentine flat tube are located. The shortest distance d between the circumferential surfaces 101 of the two adjacent cylindrical batteries 100 is a distance between two adjacent parallel intersection lines, and the two adjacent parallel intersection lines are obtained through the intersection of a plane parallel to the reference plane 500 and the circumferential surfaces 101 of the two adjacent cylindrical batteries 100.

In an embodiment, as shown in FIG. 2, the width $d_1$ of the protrusion gradually decreases from one end of the protrusion connected to the liquid cooling member 200 to one end away from the liquid cooling member 200. Such design of the protrusion may match the shape of the stacked gap 300, so that the contact area between the protrusion and the circumferential surface 101 of the cylindrical battery 100 is larger.

In an embodiment, the maximum length of the protrusion is ⅓ to ½ of the diameter of the cylindrical battery 100. In this configuration, the contact area between the protrusion and the circumferential surface 101 of the cylindrical battery 100 at the stacked gap 300 is larger.

Exemplarily, the maximum length of the maximum length $d_2$ of the protrusion may be, but not limited to, ⅓, ⅖ or ½ of the diameter of the cylindrical battery 100.

In an embodiment, the number of cylindrical batteries 100 is at least four, two of the cylindrical batteries 100 are disposed on one side of the liquid cooling member 200, and the other two of the cylindrical batteries 100 are disposed on another side of the liquid cooling member 200. The four cylindrical batteries 100 are in staggered arrangement or arranged in rows and columns.

Figure 3:
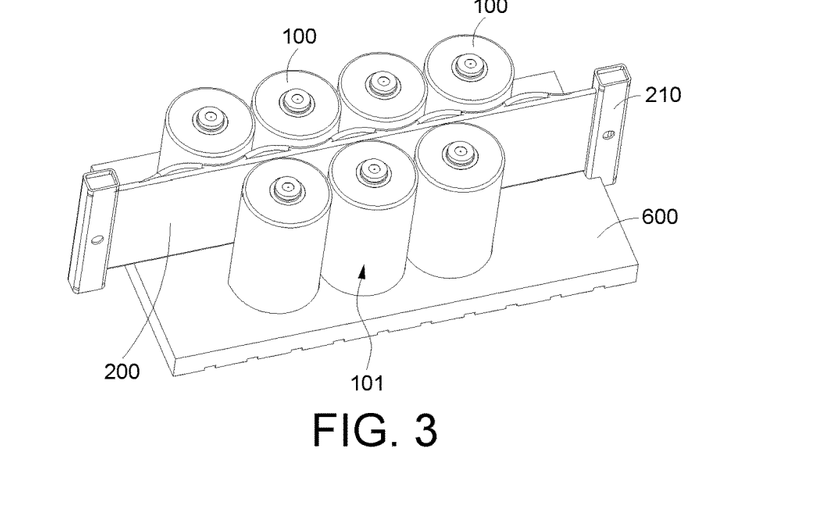
FIG. 3 is a schematic structural view of the battery apparatus according to the present embodiment.

Specifically, as shown in FIG. 3, the number of the cylindrical batteries 100 is seven, and four of the cylindrical batteries 100 are located on one side of the flat tube, and three of the cylindrical batteries 100 are located on the other side of the flat tube. The seven cylindrical batteries 100 are in staggered arrangement, that is, the diameters of the seven cylindrical batteries 100 perpendicular to the length direction of the flat tube are arranged in parallel at intervals in the length direction of the flat tube.

Figure 4:
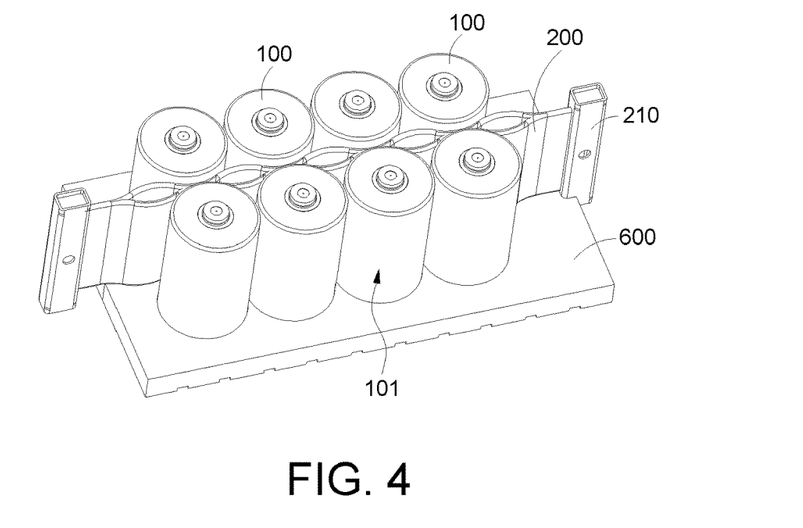
FIG. 4 is a schematic structural view of a modification of the battery apparatus according to the present embodiment.

Referring to FIG. 4, the number of cylindrical batteries 100 is eight, and the eight cylindrical batteries 100 are arranged in two rows and four columns. The two rows of cylindrical batteries 100 are located on both sides of the liquid cooling member 200 respectively, that is, there are four cylindrical batteries 100 on each side of the liquid cooling member 200, and the four cylindrical batteries 100 on both sides of the liquid cooling member 200 are respectively facing each other. In other words, the lines connecting the center at the top surface of the two cylindrical batteries 100 in each column are parallel to each other.

In an embodiment, as shown in FIG. 4, the battery apparatus further includes a battery bracket 600, and the battery and the liquid cooling member 200 are located on the battery bracket 600. The material of the battery bracket 600 is an insulating material to ensure the safety of the battery apparatus. For example, the material of the battery bracket 600 is plastic.

In an embodiment, the battery bracket 600 is provided with a placement groove, and the battery is fixedly installed in the placement groove. Exemplarily, the shape of the cross section of the placement groove is circular to adapt to the circumferential surface 101 of the cylindrical battery 100.

In an embodiment, the protrusion and the liquid cooling member 200 are integrally formed as one piece.

In an embodiment, the protrusion includes at least one bent portion 400 located between the liquid cooling member 200 and the two batteries.

In a possible design of this embodiment, the liquid cooling member 200 includes a first liquid cooling segment 201 and a second liquid cooling segment 202, and the protrusion is integrally formed between the first liquid cooling segment 201 and the second liquid cooling segment 202. Exemplarily, the first liquid cooling segments 201 are fittingly attached to the circumferential surfaces 101 of two adjacent cylindrical batteries 100 located on one side of the liquid cooling member 200, and the second liquid cooling segments 202 are fittingly attached to the circumferential surfaces 101 of two adjacent cylindrical batteries 100 on another side of the liquid cooling member 200.

Figure 5:
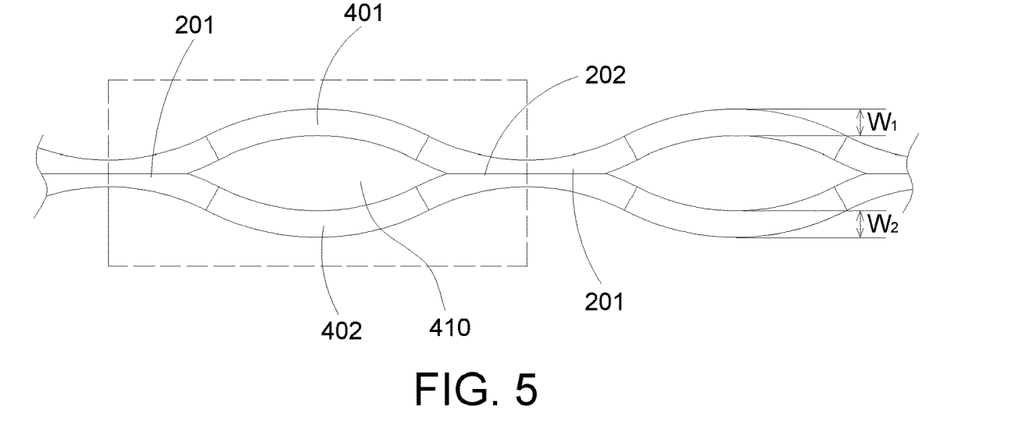
FIG. 5 is a schematic structural view of a liquid cooling member in the battery apparatus according to the present embodiment.

Specifically, as shown in FIG. 5, the first liquid cooling segment 201, the second liquid cooling segment 202 and the bent portion 400 are multiple in number. One of the first liquid cooling segments 201, one of the bent portions 400 and one of the second liquid cooling segments 202 adjacent to each other constitute one liquid cooling unit, the structure in the dashed-line frame in FIG. 5 is one liquid cooling unit, and the liquid cooling member 200 includes a plurality of liquid cooling units.

In this possible design, the bent portion 400 includes a first bent tube 401 and a second bent tube 402, and a gap is provided between the first bent tube 401 and the second bent tube 402 to form a thermal insulation cavity 410.

Specifically, since the protrusion is located in the stacked gap 300, the first bent tube 401 and the second bent tube 402 and the thermal insulation cavity 410 formed by the first bent tube 401 and the second bent tube 402 are also located in the stacked gap 300, and at least part of the outer surfaces of the first bent tube 401 and the second bent tube 402 are in contact with the circumferential surface 101 of the cylindrical battery 100.

It should be noted that the first bent tube 401 and the second bent tube 402 may be in direct contact with the battery, or may be in indirect contact. For example, the first bent tube 401 and the second bent tube 402 and the battery may be indirectly fixed through gluing.

When the battery and the liquid cooling member 200 are glued and fixed through adhesive filling, since the first bent tube 401, the second bent tube 402 and the thermal insulation cavity 410 are located in the stacked gap 300, a large amount of glue can be prevented from flowing in the stacked gap 300 between the two adjacent batteries, so as to ensure that the glue can be filled between the first bent tube 401 and the battery as well as between the second bent tube 402 and the battery, thereby reducing the amount of glue, decreasing the total weight, and effectively improving the energy density of the battery apparatus.

Exemplarily, the glue is an existing thermally conductive structural adhesive.

In this possible design, the bending directions of the first bent tube 401 and the second bent tube 402 are different.

Figure 6:
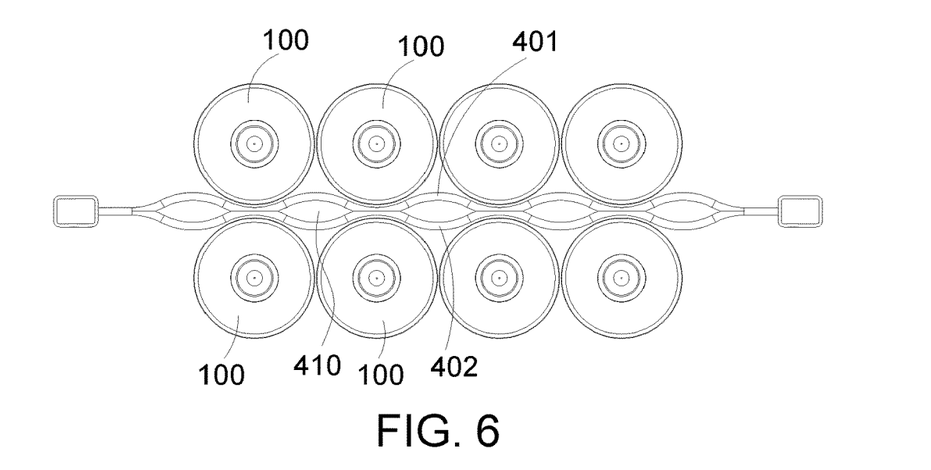
FIG. 6 is a top view of the battery apparatus according to the present embodiment.

Specifically, each of the batteries is a cylindrical battery 100. For example, as shown in FIG. 6, the number of cylindrical batteries 100 is eight, and the eight cylindrical batteries 100 are arranged in two rows and four columns, and the two rows of cylindrical batteries 100 are respectively located on both sides of the liquid cooling member 200. That is, there are four cylindrical batteries 100 on each side of the liquid cooling member 200, and the four cylindrical batteries 100 on both sides of the liquid cooling member 200 are respectively facing each other. In other words, the lines connecting the center at the top surface of the two cylindrical batteries 100 in each column are parallel to each other. The first bent tube 401 is bent toward the cylindrical battery 100 located on one side of the liquid cooling member 200, and the second bent tube 402 is bent toward the cylindrical battery 100 located on another side of the liquid cooling member 200. Such configuration not only allows the first bent tube 401 to contact the two adjacent cylindrical batteries 100 located on one side of the liquid cooling member 200, but also allows the second bent tube 402 to contact the two adjacent cylindrical batteries 100 located on another side of the liquid cooling member 200, thereby increasing the contact area for liquid cooling the cylindrical battery 100 and enhancing the liquid cooling effect. Moreover, the bending directions of the first bent tube 401 and the second bent tube 402 are opposite, which may increase the volume of the thermal insulation cavity 410, such that it is convenient to add adhesive between the cylindrical battery 100 and the liquid cooling member 200, between the cylindrical battery 100 and the first bent tube 401, and between the cylindrical battery 100 and the second bent tube 402. In this way, it is possible to reduce the amount of thermally conductive structural adhesive, improve the fixing effect of the cylindrical battery 100, the liquid cooling member 200 and the protrusion, and realize thermal insulation between the batteries to avoid thermal runaway.

In this possible design, the width of the inner cavity of the first bent tube 401 is equal to the width of the inner cavity of the second bent tube 402.

Referring to FIG. 5, the width of the inner cavity of the first bent tube 401 refers to the distance $W_1$ between two opposite tube walls of the first bent tube 401, and the width of the inner cavity of the second bent tube 402 refers to the distance $W_2$ between two opposite tube walls of the second bent tube 402, and $W_1=W_2$. Such configuration is not only convenient for production and processing, but also can ensure that the flow rates of the liquid cooling medium passing through the first bent tube 401 and the second bent tube 402 are substantially the same. As such, different batteries may be liquid-cooled more uniformly, and the temperature of the batteries inside the battery apparatus may be more consistent.

In this possible design, the interior of the thermal insulation cavity 410 is provided with a phase change material.

When the battery generates a large amount of heat, the phase change material can absorb heat, thereby dissipating heat from the battery. When the overall temperature of the battery apparatus is low, the phase change material can release heat, thereby heating the battery and improving the energy utilization efficiency.

Figure 7:
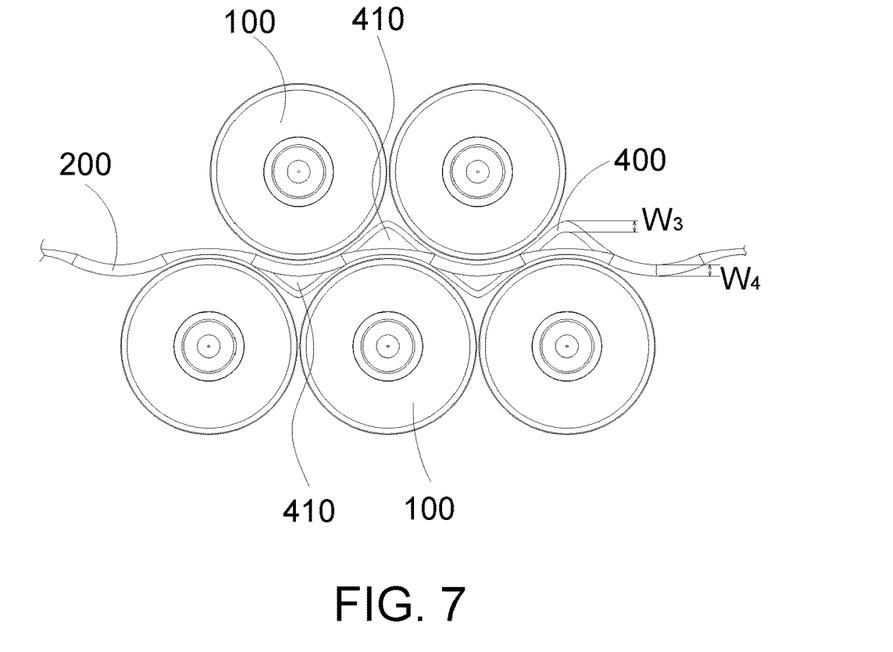
FIG. 7 is a top view of a first modification of the battery apparatus according to the present embodiment.

In another possible design of this embodiment, as shown in FIG. 7, the bent portion 400 is a bent tube, and a gap is provided between the bent tube and the liquid cooling member 200 to form a thermal insulation cavity 410.

In another possible design of the embodiment, the liquid cooling member 200 is a serpentine flat tube, and the protrusion and the serpentine flat tube are integrally formed as one piece.

In other possible design of the embodiment, the width of the inner cavity of the bent tube is equal to the width of the inner cavity of the liquid cooling member 200.

Referring to FIG. 7, the width of the inner cavity of the bent tube refers to the distance $W_3$ between the two opposite tube walls of the bent tube, and the width of the inner cavity of the liquid cooling member 200 refers to the distance $W_4$ between the two opposite tube walls of the serpentine flat tube, and $W_3=W_4$. Such configuration is not only convenient for production and processing, but also can ensure that the flow rates of the liquid cooling medium passing through the bent tube and the serpentine flat tube are substantially the same. As such, different batteries may be liquid-cooled more uniformly, and the temperature of the batteries inside the battery apparatus may be more consistent.

It should be noted that the liquid cooling member 200 may also be a flat tube.

In other possible design of the embodiment, the interior of the thermal insulation cavity 410 is provided with a phase change material.

When the battery generates a large amount of heat, the phase change material can absorb heat, thereby dissipating heat from the battery. When the overall temperature of the battery apparatus is low, the phase change material can release heat, thereby heating the battery and improving the energy utilization efficiency.

In the third possible design of the present embodiment, the width of the inner cavity of the bent portion 400 is greater than the width of the inner cavity of the liquid cooling member 200.

Figure 8:
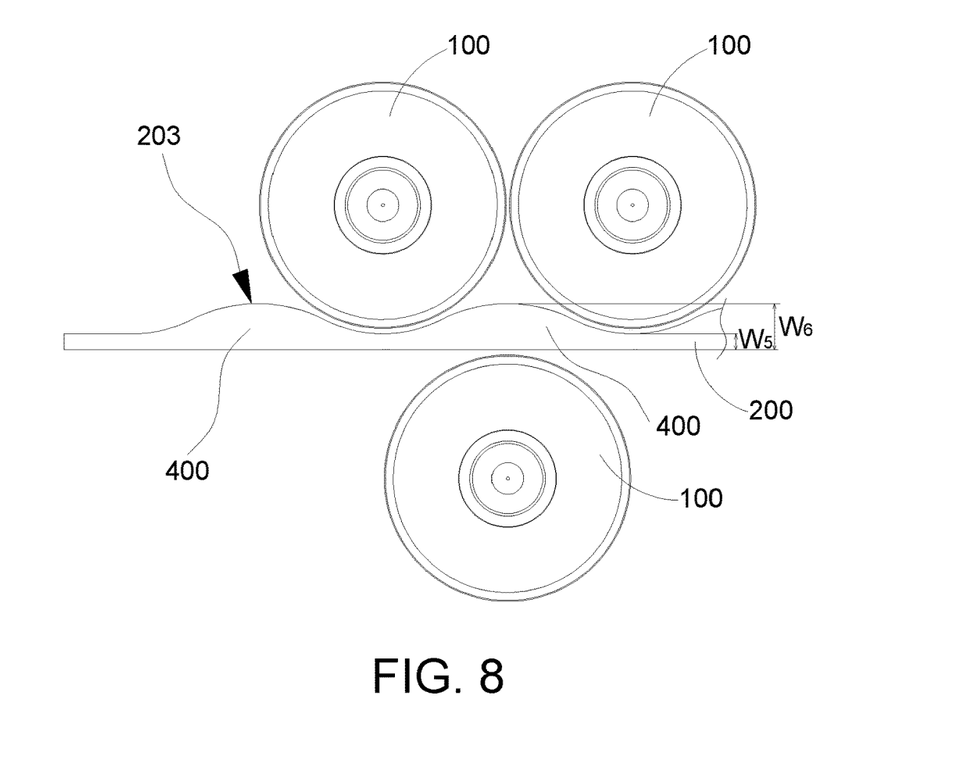
FIG. 8 is a top view of a second modification of the battery apparatus according to the present embodiment.

In the third possible design, the bent portion 400 and the liquid cooling member 200 are integrally formed as one piece. Specifically, each battery is a cylindrical battery 100, and the liquid cooling member 200 is a flat tube. The width of the inner cavity of the flat tube is $W_5$, and the tube wall at one side of the flat tube protrudes toward the stacked gap 300 to form the bent portion 400. In order to clearly describe the technical solution of this embodiment, the tube wall of the flat tube formed with the bent portion 400 is named as the protruding tube wall 203. Referring to FIG. 8, when the cylindrical battery 100 is arranged in a staggered manner, the width of the inner cavity of the bent portion 400 refers to the maximum distance $W_6$ between the protruding tube wall 203 of the serpentine flat tube and the opposite tube wall on another side, and $W_6>W_5$. In this configuration, the flow rate of the liquid cooling medium in the bent portion 400 may be increased. In the meantime, when the liquid cooling medium passes through the bent portion 400 having a wider inner cavity, a vortex will be formed, which may increase the retaining time of the liquid cooling medium in the bent portion 400, thereby further enhancing the heat exchange capability between the liquid cooling medium and the cylindrical battery 100. Moreover, the amount of filling-glue to be poured may be reduced, thereby reducing the total weight of the battery apparatus, so that the energy density of the battery apparatus is effectively improved.

Figure 9:
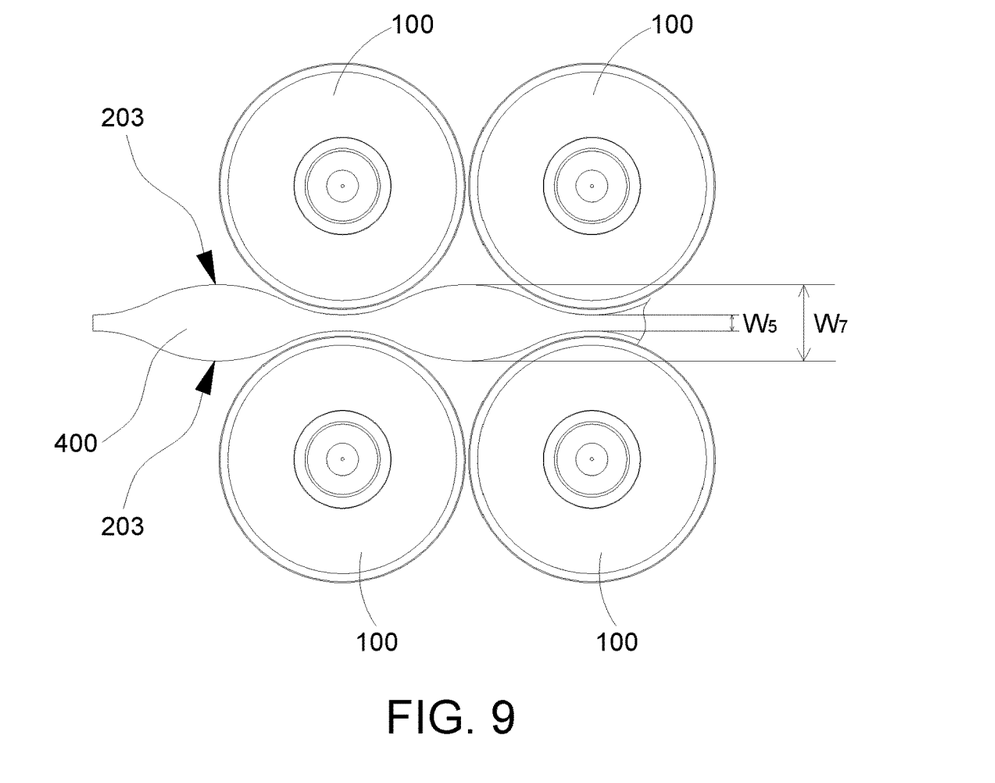
FIG. 9 is a top view of a third modification of the battery apparatus according to the present embodiment.

Referring to FIG. 9, when the cylindrical batteries 100 are arranged in rows and columns, two opposite tube walls of the flat tubes protrude in directions away from another tube wall, so as to form two oppositely arranged sub-bent portions. The two sub-bent portions communicate with each other to form a protrusion, and the width of the inner cavity of the protrusion refers to the maximum distance $W_7$ between the two opposite protruding tube walls 203 of the flat tube, and $W_7>W_5$. In this configuration, the flow rate of the liquid cooling medium in the protrusion may be increased. In the meantime, when the liquid cooling medium passes through the protrusion having a wider inner cavity, a vortex will be formed, which may increase the retaining time of the liquid cooling medium in the protrusion, thereby further enhancing the heat exchange capability between the liquid cooling medium and the cylindrical battery 100. Moreover, the amount of filling-glue to be poured may be reduced, thereby reducing the total weight of the battery apparatus, so that the energy density of the battery apparatus is effectively improved.

Figure 10:
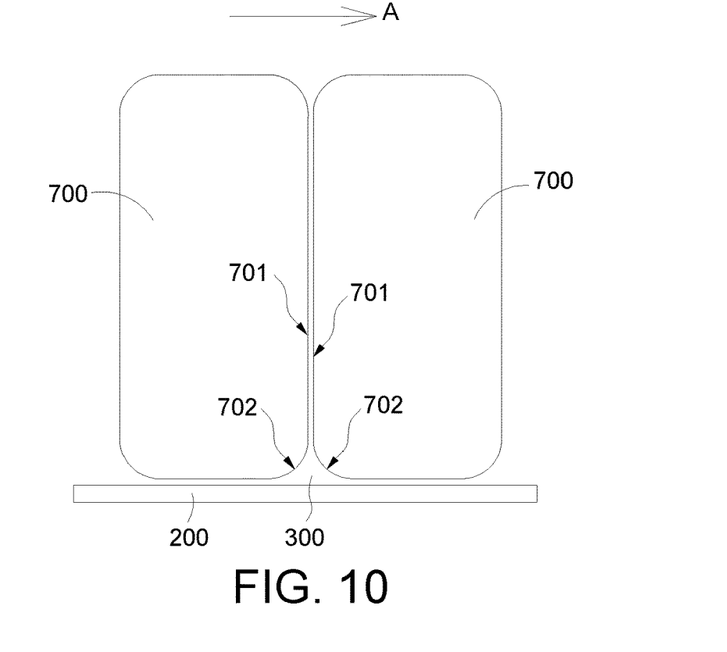
FIG. 10 is a schematic structural view of a stacked gap in the battery apparatus according to the present embodiment (the batteries are square batteries).

It should be noted that each battery may also be a square battery 700. Exemplarily, as shown in FIG. 10, an arrow direction A represents a stacking direction of the square batteries 700, and each square battery 700 has two stacked surfaces 701 disposed in an opposite manner and an outer peripheral surface disposed around the two stacked surfaces 701. The stacked surface 701 is perpendicular to the stacking direction of the square batteries 700, and the outer peripheral surface is parallel to the stacking direction of the square batteries 700. There is a smooth transition between each stacked surface 701 and the outer peripheral surface to form a curved surface 702. The liquid cooling member 200 is a liquid cooling plate, and exemplarily, the liquid cooling plate is disposed below the square batteries 700.

Figure 11:
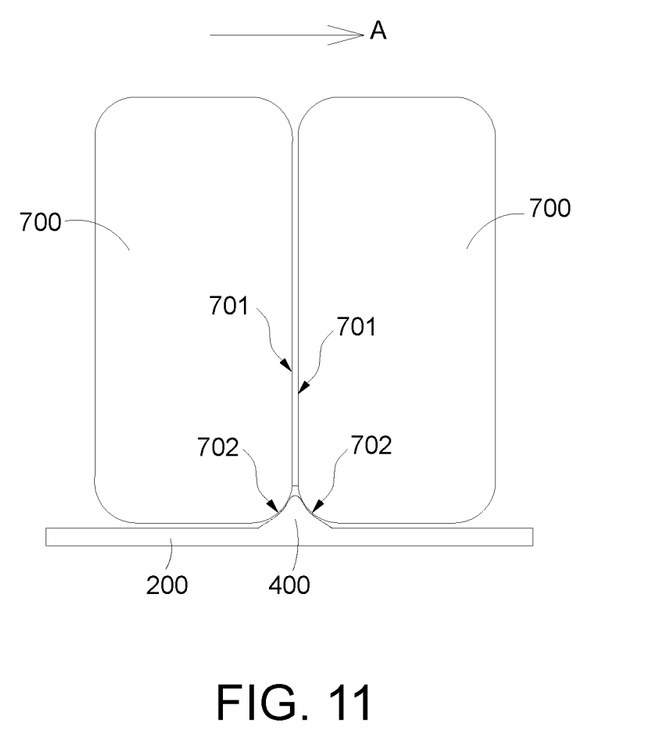
FIG. 11 is a top view of a fourth modification of the battery apparatus according to the present embodiment.

Referring to FIG. 10, the shortest distance between the two closely arranged smoothly transitioned curved surfaces 702 of two adjacent square batteries 700 gradually increases from one end of the curved surfaces 702 away from the liquid cooling plate to one end of the curved surfaces 702 adjacent to the liquid cooling plate. The cavity enclosed by the two closely arranged curved surfaces 702 of two square batteries 700 located on the same side of the liquid cooling plate and one lateral side of the liquid cooling plate adjacent to the bottom of the square battery 700 is the stacked gap 300, as shown in FIG. 11, the protrusion is located within the stacked gap 300. Specifically, the upper surface of the liquid cooling plate protrudes toward the stacked gap 300 to form a protrusion.

It should be noted that, the battery apparatus provided in this embodiment may be a battery module. The battery module includes a plurality of batteries, and the batteries may be square batteries 700 or cylindrical batteries 100. When the batteries are square batteries 700, the battery module may further include an end plate and a lateral plate, and the end plate and the lateral plate are used to fix a plurality of batteries. When the batteries are cylindrical batteries 100, the battery module may further include a bracket, and the battery may be fixed on the bracket.

The battery apparatus provided in this embodiment may also be a battery pack. The battery pack includes a plurality of batteries and a battery box, and the battery box is used to fix a plurality of batteries. The plurality of batteries may be formed into a battery module and then assembled in the battery box. Alternatively, the plurality of batteries may be directly arranged in the battery box, that is, the battery box is used to fix the plurality of batteries with no need to arrange the plurality of batteries into groups.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery apparatus, comprising a liquid cooling member and at least two batteries arranged in a stack, wherein the at least two batteries are located on a same side of the liquid cooling member, and the liquid cooling member is provided with a protrusion, the protrusion communicates with the liquid cooling member, the protrusion is located between the liquid cooling member and the at least two batteries, and the protrusion at least cools the at least two batteries simultaneously, the protrusion comprises at least one bent portion located between the liquid cooling member and the at least two batteries, the liquid cooling member is a serpentine flat tube including a protruding tube wall on one side and a flat wall on another side, a width of an inner cavity of the bent portion referring to a maximum distance between the protruding tube wall and the flat wall is larger than a width between a circumferential surface of one of the batteries and the flat wall.

2. The battery apparatus according to claim 1, wherein the protrusion is disposed in contact with the at least two batteries.

3. The battery device according to claim 1, wherein a width of the protrusion gradually decreases from one end of the protrusion connected to the liquid cooling member to one end of the protrusion away from the liquid cooling member.

4. The battery apparatus according to claim 1, wherein the protrusion and the liquid cooling member are integrally formed as one piece.

5. The battery apparatus according to claim 1, wherein each of the batteries is a cylindrical battery.

6. The battery apparatus according to claim 5, wherein a number of the cylindrical battery is at least four, and two of the cylindrical batteries are disposed on one side of the liquid cooling member, the other two of the cylindrical batteries are disposed on another side of the liquid cooling member, and the four cylindrical batteries are in staggered arrangement or arranged in rows and columns.

7. The battery apparatus according to claim 5, wherein a maximum length of the protrusion is ⅓ to ½ of a diameter of the cylindrical battery.

* * * * *